United States Patent
Moss (10) Patent No.: US 11,306,497 B2
(45) Date of Patent: Apr. 19, 2022

(54) SUPPORT POST

(71) Applicant: Safetyrespect AB, Oestersund (SE)

(72) Inventor: Stefan Moss, Oestersund (SE)

(73) Assignee: SAFETYRESPECT AB, Oestersund (SE)

( * ) Notice: Subject to any disclaimer, the term of this patent is extended or adjusted under 35 U.S.C. 154(b) by 0 days.

(21) Appl. No.: 16/971,749

(22) PCT Filed: Feb. 25, 2019

(86) PCT No.: PCT/EP2019/054543
§ 371 (c)(1),
(2) Date: Aug. 21, 2020

(87) PCT Pub. No.: WO2019/162486
PCT Pub. Date: Aug. 29, 2019

(65) Prior Publication Data
US 2020/0407990 A1 Dec. 31, 2020

(30) Foreign Application Priority Data
Feb. 26, 2018 (SE) .................................. 1850214-6

(51) Int. Cl.
*E04G 25/04* (2006.01)
*F16M 11/28* (2006.01)

(52) U.S. Cl.
CPC ............. *E04G 25/04* (2013.01); *F16M 11/28* (2013.01); *E04G 2025/045* (2013.01); *F16M 2200/025* (2013.01)

(58) Field of Classification Search
CPC ... E04G 25/04; E04G 2025/045; E04G 25/08; E04G 25/06; E04G 25/066; E04G 25/068;
(Continued)

(56) References Cited

U.S. PATENT DOCUMENTS 1,551,432 A * 8/1925 Schaeffer ................ E04G 25/08
254/134
2,483,395 A * 10/1949 George .................. E04G 25/08
403/105

(Continued)

FOREIGN PATENT DOCUMENTS

| DE | 2318796 A1 | 10/1973 |
| DE | 19805474 C1 | 7/1999 |
| FR | 1087309 A | 2/1955 |
| FR | 2347509 A1 | 4/1977 |

OTHER PUBLICATIONS

International Searching Authority, International Search Report and Written Opinion received for International Application No. PCT/EP2019/054543, dated Jun. 14, 2019, 13 pages, European Patent Office, Netherlands.

*Primary Examiner* — Christopher Garft
(74) *Attorney, Agent, or Firm* — Alston & Bird LLP (57) ABSTRACT

The present invention relates to a support post (2) comprising at least two tubes (4, 6) telescopically in sliding connection to each other. A locking device (8) holds the tubes in a locked state and allowing relative sliding of the tubes in an unlocked state. At least one end (10) of the support post has an opening (12; 112) in connection with a surface support element (14; 114). A spring is arranged within the opening of the support post to act on the surface support element (14; 114), to resiliently affect the surface support element (14; 114) in a direction away from the open end (10) of the support post and vice versa. The locking device (8) comprises a locking ring loosely arranged on one of the tubes (4) and further comprises a first ring holding arm arranged at one end of the other tube (6); the first ring holding arm having a first recess for retaining the locking ring in loose arrangement around said tube (4) with limited movability. A lever is in engagement with the spring and arranged in a first position in an unstressed condition of the (Continued)

spring. The lever is arranged in a second position in a stressed condition of the spring. By moving the lever from the first position to the second position, and vice versa, resiliently affect the surface support element (14; 114) in a direction to and from the open end (10) of the support post (2). The surface support element is arranged to be installed on a floor, and the lever is a pedal.

12 Claims, 5 Drawing Sheets

(58) Field of Classification Search
CPC ............. F16M 11/28; F16M 2200/025; F16M 2200/027; F16M 2200/08; F16B 7/14; F16B 7/1454; F16B 2007/16
USPC ............................................ 248/188.5, 354.1
See application file for complete search history.

(56) References Cited

U.S. PATENT DOCUMENTS

| | | | |
|---|---|---|---|
| 5,595,410 A * | 1/1997 | Wilson | E05C 19/008 |
| | | | 292/259 R |
| 6,179,514 B1 * | 1/2001 | Cheng | B25G 3/10 |
| | | | 285/308 |
| 6,663,060 B1 * | 12/2003 | Gifford, Sr. | F16B 7/14 |
| | | | 248/125.8 |
| 7,510,152 B2 | 3/2009 | Melic | |
| 7,611,104 B1 * | 11/2009 | Gifford, Sr. | F16M 11/046 |
| | | | 248/176.3 |
| 2004/0247379 A1 * | 12/2004 | Guidetti | F16B 2/246 |
| | | | 403/109.7 |
| 2011/0068568 A1 * | 3/2011 | Cerezo Lotina | E04G 21/26 |
| | | | 285/32 |
| 2016/0208503 A1 * | 7/2016 | May | E04G 21/243 |

* cited by examiner

SUPPORT POST

CROSS REFERENCE TO RELATED APPLICATIONS

This application is a National Stage Application, filed under 35 U.S.C. § 371, of International Application No. PCT/EP2019/054543, filed Feb. 25, 2019, which claims priority to Swedish Application No. 1850214-6, filed Feb. 26, 2020; the contents of both of which are hereby incorporated by reference in their entirety.

BACKGROUND

Related Field

The invention relates to a support post comprising at least two tubes telescopically slidable into each other according to the appended claims.

Description of Related Art

Support posts are used for various fields of application, such as for installation between opposing surfaces. When installing a support post between opposing side walls or from floor to ceiling, it is advantageous if the support post is adjustable. Therefore, such support posts are usually adjustable, by using tubes that are telescopically slidable into each other. One field of application is for installation between opposing side walls or from floor to ceiling for protection as part of edge protection systems in building construction systems. For instance, support posts installed between floor and ceiling in a construction site are used as support for temporary edge protection barriers, for closing off a dangerous area such as an opening in the floor or in an exterior wall. It is essential that safety can be guaranteed for the building construction workers and visitors. Consequently, the support posts must be securely fastened and reliably installed in order to withstand certain stress. Although it is possible to fasten the support posts to the surfaces by fastening means, it is not always necessary and not desirable for practical reasons. Thus, it is common to use support posts of telescoping tubes that are stretched out and tightened in firm and solid contact against adjacent surfaces, without using fastening means for securing the post to the adjacent surfaces.

U.S. Pat. No. 7,510,152 discloses an extendable post installable between opposed surfaces. The post comprises two tubes in sliding telescoping engagement. The post further comprising a surface engaging member having a stem slidably received in an open end of one of the tubes. A spring within the tube is provided for acting on the stem to resiliently urge the stem, and thus the surface engaging member, in a direction out of the open end of the tube. In addition, a retainer limiting movement is provided by a collar part secured in the tube and a pin having a head at one end secured to the stem, which limits movement of the surface engaging member, in a direction out of the open end of the tube.

BRIEF SUMMARY

Despite prior art there is a need to develop a support post which is fast and easy to install and to disassemble. There is also a need for such a support post which can be securely fastened, and effectively and reliably installed in order to guarantee safety. Furthermore, there is a need for a support post that can be installed in firm and solid contact against adjacent surfaces, without using fastening means for securing the post to the adjacent surfaces.

An object of the invention is thus to provide a support post which is easy and fast to install and disassemble. Another object of the invention is to provide a support post which can be securely fastened as well as effectively and reliably installed in order to guarantee safety. An even further object is to provide a support post that can be installed in firm and solid contact against adjacent surfaces, without using fastening means for securing the post to the adjacent surfaces.

According to a first aspect of the invention, a support post comprising at least two tubes telescopically in sliding connection to each other is provided. The support post comprises a locking device holding the tubes in a locked state relative each other and allowing relative sliding of the tubes into each other in an unlocked state. At least one end of the support post has an opening in connection with a surface support element having a profile member in sliding engagement with the open end of the support post. A spring is in a first end arranged within the opening of the support post and surrounded by a wall section of the tube. A second end of the spring is arranged to act on the surface support element, to resiliently affect the surface support element in a direction away from the open end of the support post and vice versa. The locking device comprises a locking ring loosely arranged on one of the tubes and further comprises a first ring holding arm arranged at one end of the other tube; the first ring holding arm having a first recess for retaining the locking ring in loose arrangement around said tube with limited movability. A lever is arranged close to the open end of the support. The lever has a free outer end positioned on the outside of support post and an inner portion in engagement with the spring within the opening of the support post. The lever is arranged in a first position in an unstressed condition of the spring where the surface support element is retracted in a direction towards the open end of the support post. Further, the lever is arranged in a second position in a stressed condition of the spring where the surface support element is projecting in a direction away from the open end of the support post. By moving the lever from the first position to the second position, and vice versa, resiliently affect the surface support element in a direction to and from the open end of the support post. The surface support element is arranged to be installed on a floor and the lever is a pedal.

This has the advantage that a cost efficient and effective mechanism is provided that is easy to manoeuvre and fixate in the desired position, using a foot operation to activate the lever. Further, an uncomplicated way to control the displacement of the surface support element is provided. Yet further, installation of the support post to the pre-stressed condition will be achieved with insignificant or apparently no alteration of the support post.

Further, the first aspect of the invention has the advantage that the support post provided is very easy to install as the support post can be prearranged between two opposing surfaces by pulling apart the tubes such that the surface support element provided at least on one of the tube ends is close the surface. The other end of the support post should at the same time be in contact, or in close contact, with the opposing surface. By moving the lever to the second position, the spring is set in a stressed condition where the surface support element is pressed against the surface, while the other end of the support post is pressed against the opposing surface. Consequently, the support post is easily and effectively installed in a stressed condition between the two opposing surfaces. Furthermore, since the lever is arranged close to the open end of the support post, it can be easily handled during installation of the support post. Furthermore, the support post can be installed in firm and solid contact against adjacent surfaces, without using fastening means for securing the post to the adjacent surfaces.

According to another aspect of the invention, the profile member is a tube portion and the second end of the spring is arranged within the tube portion.

This has the advantage that the profile member may easily slide within the outer open ends of the tubes and it makes it possible to arrange parts of the mechanism, such as the spring, within the tube of the profile member.

According to yet another aspect of the invention, the inner portion of the lever is in engagement with the first end of the spring.

This has the advantage that the lever can be arranged close to the open end of the support post, providing the spring to be set in stressed condition, by moving the lever to the second position, where the surface support element is pressed against the surface. Hence, uncomplicated handling of the support post is provided during installation.

According to a further aspect of the invention, at least one plunger is slidingly arranged within the tube portion, the inner portion of the lever is in connection with an upper side of the plunger and the lower side of the plunger is in engagement with the spring.

This has the advantage that it is easy to control the resilience of the spring from the unstressed to the stressed condition, and vice versa, by moving the plunger via activation of the lever.

According to yet another aspect of the invention, the tube wall section comprises an attachment for locking the lever when the lever is arranged in the second position in a stressed condition of the spring.

This has the advantage that the support post is reliably installed and is safety secured when installed by the attachment for locking the lever. Further, it is an advantage that the lever is securely locked in position in the attachment such that the support post in installed position will be able to withstand certain stress when subjected to any influencing power, by accident or deliberate.

According to a further aspect of the invention, the lever is connected to a hook-shaped link that interacts with the attachment for locking the lever in the second position.

This has the advantage that secured locking of the lever in the second position can be done easily and with few parts. Further, it provides for an uncomplicated and easy unlocking once the support post should be uninstalled, in a reliable and safety way, by providing a pressure on the hook-shaped link to release from the interaction with the attachment.

According to yet a further aspect of the invention, the lever is connected to the plunger via a link arm, which is pivotally connected to the lever in one end and to the plunger in a second end.

This has the advantage that a cost efficient and effective mechanism having few components is provided.

According to another aspect of the invention, a tension spring is arranged to the surface support element and fixedly arranged to the tube wall section.

This has the advantage that an uncomplicated way to control the displacement of the surface support element is provided. The surface support element is retracted by the tension of the tension spring in a direction towards the open end of the support post, which avoids undesired play of the surface support element. In this way, it possible to restrict too much displacement of the surface support element for projecting out of the open end of the support post.

The above disclosed embodiments all contribute to the support post being easy to install as well as to remove whilst maintaining the high level safety required when the support posts are used to support railings or safety nets on construction sites.

BRIEF DESCRIPTION OF THE FIGURES

Below is a description of, as examples, preferred embodiments of the invention with reference to the enclosed drawings, in which.

DETAILED DESCRIPTION OF VARIOUS EMBODIMENTS

Figure 1:
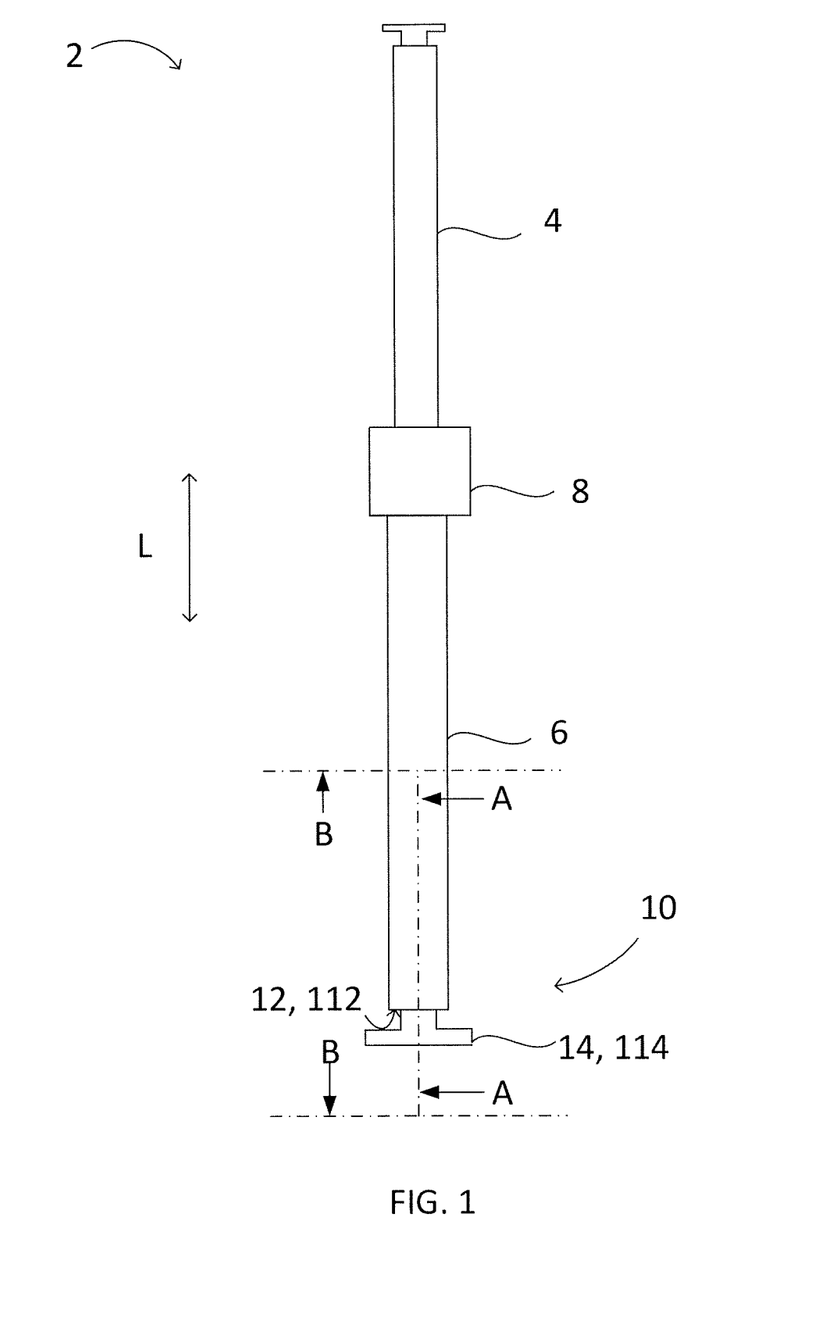
FIG. 1 schematically illustrates a side view of a support post according to the invention, FIG. 2a schematically illustrates a cross-sectional view B-B at the end of the support post in FIG. 1, according to the invention, FIG. 2b schematically illustrates a cross-sectional view B-B at the end of the support post in FIG. 1, according to the invention, FIG. 2c schematically illustrates a cross-sectional view B-B at the end of the support post in FIG. 1, according to the invention, FIG. 2d schematically illustrates a cross-sectional view B-B at the end of the support post in FIG. 1, according to the invention, FIG. 3a schematically illustrates a cross-sectional view A-A at the end of the support post in FIG. 1, according to the invention, FIG. 3b schematically illustrates a cross-sectional view B-B at the end of the support post in FIG. 1, according to the invention, FIG. 3c schematically illustrates a cross-sectional view B-B at the end of the support post in FIG. 1, according to the invention, FIG. 3d schematically illustrates a cross-sectional view B-B at the end of the support post in FIG. 1, according to the invention, FIG. 3e schematically illustrates a cross-sectional view B-B at the end of the support post in FIG. 1, according to the invention, FIG. 3f schematically illustrates a cross-sectional view B-B at the end of the support post in FIG. 1, according to the invention, and FIG. 4 schematically illustrates a cross-sectional view of a locking device for a support post as shown in FIG. 1, according to the invention.

FIG. 1 schematically illustrates a support post 2 comprising at least two tubes 4, 6 telescopically in sliding connection to each other, according to a first aspect of the invention. The support post 2 is suitable for installation between opposing side walls or from floor to ceiling for protection in building constructions sites. The support post 2 can be installed between floor and ceiling in a construction site are used as support for temporary edge protection, for closing off a dangerous area such as an opening in the floor or in an exterior wall. The support post 2 further comprises a locking device 8 holding the tubes in a locked state relative each other and allowing relative sliding of the tubes into each other in an unlocked state. At least one end 10 of the support post 2 has an opening 12 in connection with a surface support element 14.

Figures 2A, 2B:
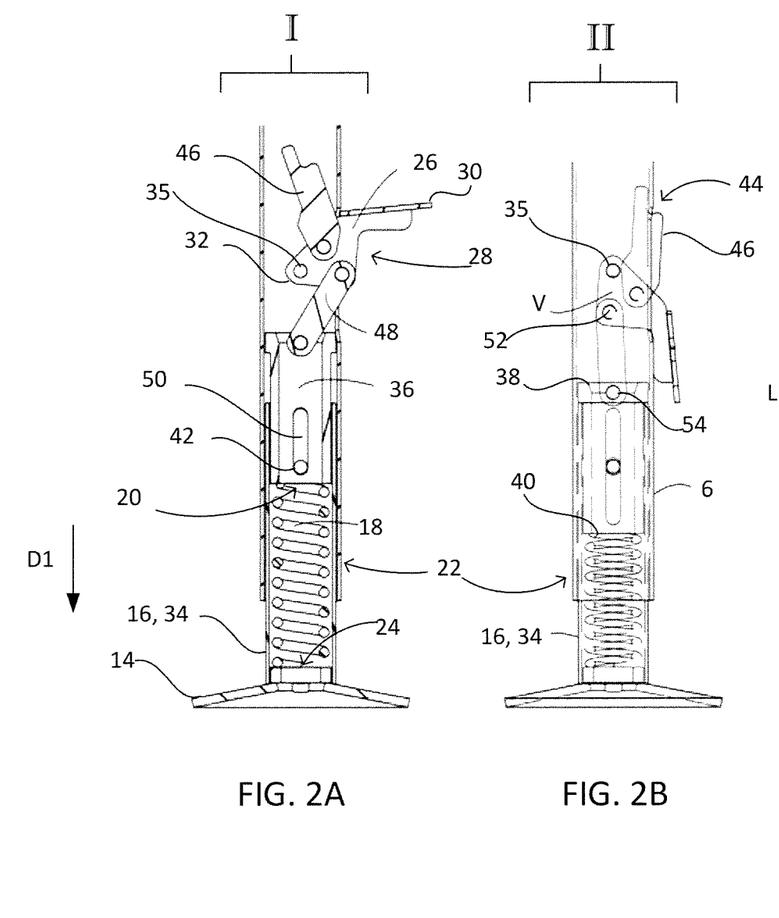

FIG. 2a schematically illustrates a cross-sectional view of the one end 10 of the support post 2 in connection with the surface support element 14, according to another aspect of the invention. The surface support element 14 has a profile member 16 in connection with the opening 12, whereby the profile member 16 is in sliding engagement with the open end 10 of the support post 2. A spring 18 is arranged within the opening 12 of the support post 2 and surrounded by a wall section 22 of the tube 6. The spring 18 may be a coil spring. The spring 18 is in a first end 20 arranged within the opening and in a second end 24 arranged to act on the surface support element 14. The spring 18 resiliently affect the surface support element 14 in a direction away D1 from the open end 10 of the support post and vice versa. A lever 26 is arranged close to the open end 10 of the support post 2. The lever 26 may be arranged to extend through an aperture 28 of the tube wall section 22. The lever 26 has a free outer end 30 positioned on the outside of support post. The free outer end 30 of the lever 26 may be pedal, suitable to be pushed by a foot, or a hand-lever. The lever 26 has an inner portion 32 in engagement with the spring 18 within the opening 12 of the support post. Alternatively, the lever 26 may have the inner portion 32 in engagement with an axle bar (not shown) that extends through the tube and which axle bar is in engagement with the spring 18 within the opening 12 of the support post. FIG. 2a shows the one end 10 of the support post 2 with the lever 26 arranged in a first position I in an unstressed condition of the spring 18. The surface support element 14 is retracted in a direction towards the open end 10 of the support post.

FIG. 2b schematically illustrates a cross-sectional view of the one end 10 of the support post 2 in connection with the surface support element 14, according to the another aspect of the invention. FIG. 2b shows the one end 10 of the support post 2 with the lever 26 arranged in a second position II in a stressed condition of the spring 18. The surface support element 14 is projecting in a direction away D1 from the open end 10 of the support post. Consequently, as illustrated in FIGS. 2a and 2b, moving the lever 26 from the first position I to the second position II, and vice versa, resiliently affect the surface support element 14 in a direction to and from the open end 10 of the support post 2.

As further illustrated in FIGS. 2a and 2b, the profile member 16 may be provided as a tube portion 34 where the second end 24 of the spring 18 is arranged within the tube portion 34. Thus, the whole spring 18 may be enclosed by the tube portion. The inner portion 32 of the lever 26 may be pivotally arranged in a pivot 35 within the tube wall section 22. The inner portion 32 of the lever 26 may be in engagement, in direct or indirect contact, with the first end 20 of the spring 18. At least one plunger 36 may be slidingly arranged within the tube portion 34. As illustrated in FIGS. 2a and 2b, there may be a single plunger 36 and the inner portion 32 of the lever 26 may be in connection with an upper side 38 of the single plunger 36. The lower side 40 of the single plunger 36 may be in engagement with the spring 18. A locking pin 42 may be in engagement with the plunger 36 to limit the movement of the plunger 36. This has the advantage that an uncomplicated way to control the displacement of the plunger is provided, when affecting the spring to resiliently affect the surface support element in a direction away from the open end of the support post. In this way, it is possible to restrict too much displacement of the surface support element for projecting out of the open end of the support post.

The locking pin 42 may be fixed to the tube wall section 22 close to the open end 10 of the support post. The locking pin 42 may extend perpendicular into the tube with respect to the longitudinal direction L of the support post. The plunger 36 may be provided with a slot 50. The locking pin 42 may extend at least through a part of the slot 50 of the plunger 36. This has the advantage that the mechanism and design of the components for controlling the displacement of the plunger can be provided effectively and uncomplicated.

Alternatively, instead of providing a locking pin, the tube wall section 22 may be provided with a deformation (not shown) that limit the movement of the plunger 36. Yet further illustrated in FIGS. 2a and 2b, the tube wall section 22 may comprise an attachment 44 for locking the lever 26 when the lever is arranged in the second position (II) in a stressed condition of the spring 18. The attachment 44 may be provided as an edge 45 of the tube wall section 22, at the upper end of the aperture 28 of the tube wall section 22, according to the alternative aspect of the invention mentioned above. The lever 26 may be connected to a hook-shaped link 46 that has an L-formed recess 47. Further, the lever 26 may be connected to the plunger 36 via a link arm 48, which is pivotally connected to the lever 26 in one end 52 and to the plunger 36 in a second end 54. FIG. 2a shows the lever 26 arranged in a first position I in an unstressed condition of the spring 18. The surface support element 14 is retracted by the tension of the spring 18 in a direction towards the open end 10 of the support post, which avoids undesired play of the surface support element 14. For installation, the support post is prepared between two opposing surfaces by pulling apart the tubes 4, 6 such that the surface support element 14 provided at least on one of the tube ends is close to one surface. The locking device 8 is set to hold the tubes 4, 6 in a locked state relative each other. The other end of the support post should at the same time be in contact, or in close contact, with the opposing surface. By moving the lever 26 to the second position as evident from FIG. 2b, the plunger 36 compress the spring 18 such that the support post 2 is set in the stressed condition II. At the same time the surface support element is pressed against the surface, while the other end of the support post is pressed against the opposing surface. As further shown in FIG. 2b, when the lever 26 reaches its lower position, the link arm passes the vertical axis V. The pre-stressed condition of the support post is kept since the lever stops against the tube wall. At the same time, part of the hook-shaped link 46 may be passed through the aperture 28, according to the alternative aspect of the invention mentioned above, where the L-formed recess 47 interacts with the edge 45.

Figures 2C, 2D:
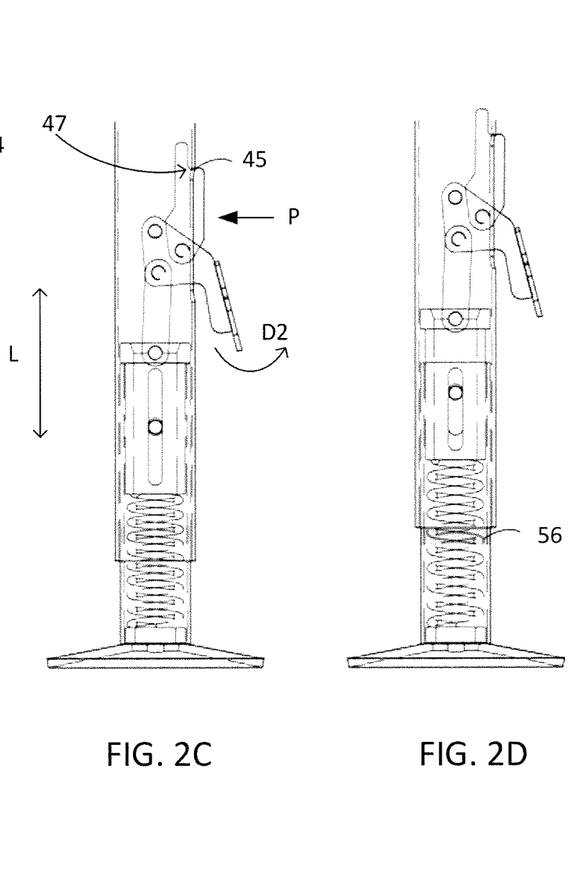

FIG. 2c schematically illustrates a cross-sectional view of the one end 10 of the support post 2, according to another aspect of the invention, where the lever 26 is pulled in opposite direction D2 for loosening the pre-stressed condition of the support post. The hook-shaped link 46 works as a safety lock, such that the L-formed recess 47 is pressed towards the edge 45, due to tension from the spring 18 and the lever is locked from moving further in the opposite direction D2. In order to unlock the lever 26 and let the lever move further in the opposite direction, the hook-shaped link 46 is pushed P in the direction back into the tube. Then the lever is free to move further in the opposite direction D2 and the tension of the spring 18 is released, whereby the lever 26, the link arm 48, the plunger 36 and the spring 18 returns to the unstressed condition in their initial position I as shown in FIG. 2a.

If the contact of the support post 2 is set between floor and ceiling before the spring is activated, installation of the support post to the pre-stressed condition will be achieved with insignificant or apparently no alteration of the support post. The components in motion will only move within the tube 34 of the surface support element 14. If there is a little play between floor and ceiling, the tube 34 of the surface support element 14 will be moved a short distance due to the slot 50 in the plunger 36. FIG. 2d schematically illustrates a cross-sectional view of the one end 10 of the support post 2 in connection with the surface support element 14, according to the another aspect of the invention, in a pre-stressed condition II of the support post. The outside of the tube 34 of the surface support element 14 may be provided with an indication 56. If the play is too large, the indication 56 will be visible below the lower edge of the tube 6.

Figure 3A:
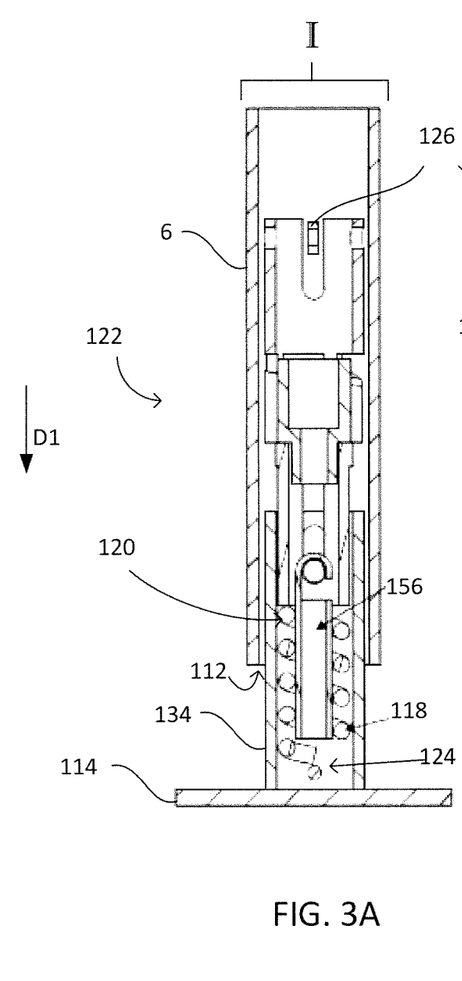
Figures 3B, 3C:
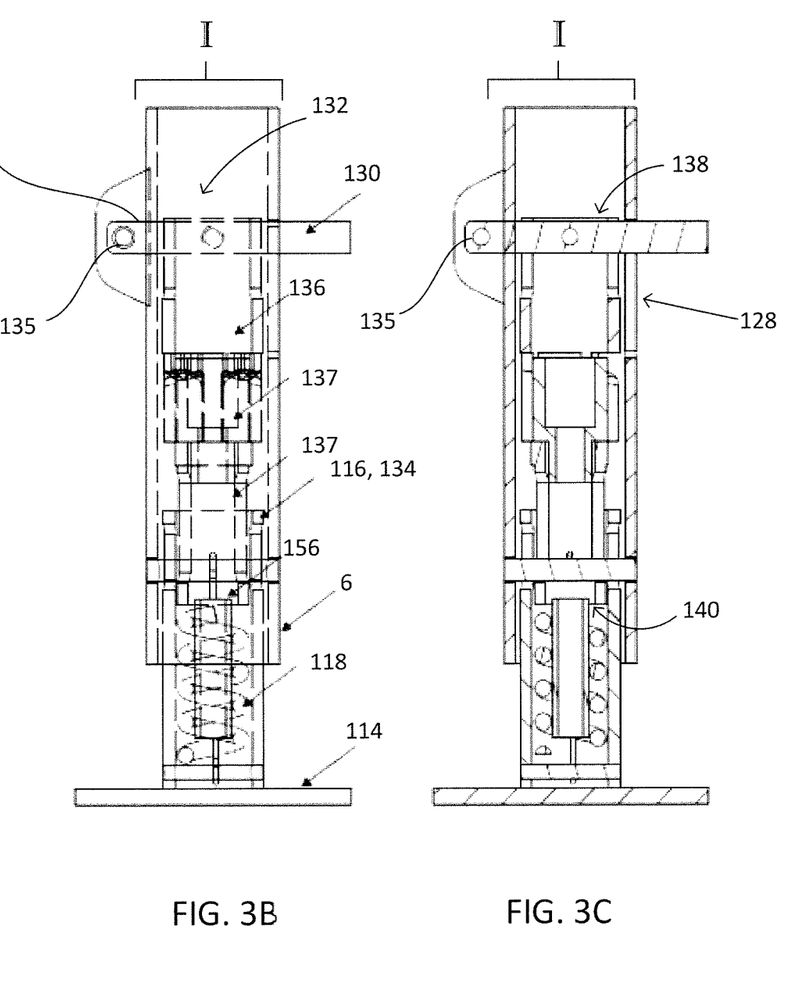

FIG. 3a schematically illustrates a cross-sectional view of the one end 10 of the support post 2 in connection with the surface support element 114, according to yet another aspect of the invention. The surface support element 14 has a profile member 116 in connection with the opening 112, whereby the profile member 116 is in sliding engagement with the open end 10 of the support post 2. Further, FIGS. 3b and 3c schematically illustrates a cross-sectional view, turned perpendicular compared to the cross-sectional view in FIG. 3a, at the end of the support post in FIG. 1, according to the yet another aspect of the invention. A spring 118 is arranged within the opening 112 of the support post 2 and surrounded by a wall section 122 of the tube 6. The spring 118 may be a coil spring. The spring 118 is in a first end 120 arranged within the opening and in a second end 124 arranged to act on the surface support element 114. The spring 118 resiliently affect the surface support element 114 in a direction away D1 from the open end 110 of the support post and vice versa. A lever 126 may be arranged close to the open end 10 of the support post 2. The lever 126 may be arranged to extend through an aperture 128 of the tube wall section 122. The lever 126 has a free outer end 130 positioned on the outside of support post. The free outer end 130 of the lever 126 may be pedal, suitable to be pushed by a foot, or a hand-lever. The lever 126 has an inner portion 132 in engagement with the spring 118 within the opening 112 of the support post. Alternatively, the lever 126 may have the inner portion 132 in engagement with an axle bar (not shown) that extends through the tube and which axle bar is in engagement with the spring 118 within the opening 112 of the support post. FIGS. 3a-3c shows the one end 10 of the support post 2 with the lever 126 arranged in a first position I in an unstressed condition of the spring 118. The surface support element 114 is retracted in a direction towards the open end 10 of the support post.

Figures 3D, 3E:
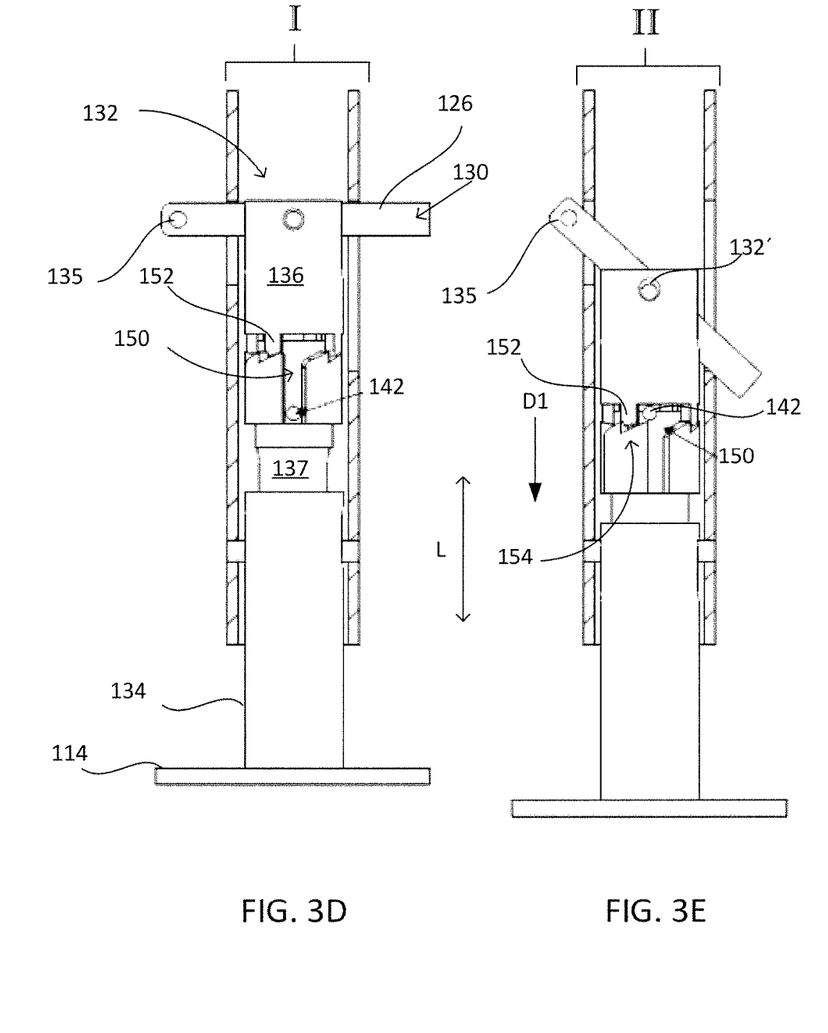

Further, FIG. 3d schematically illustrates a cross-sectional view corresponding to FIGS. 3b-c, but with the components within the tube in without a cross-sectional view, at the end of the support post in FIG. 1, according to the yet another aspect of the invention. In accordance with FIGS. 3a-3c, also FIG. 3d shows the one end 10 of the support post 2 with the lever 126 arranged in a first position I in an unstressed condition of the spring 118.

Figure 3F:
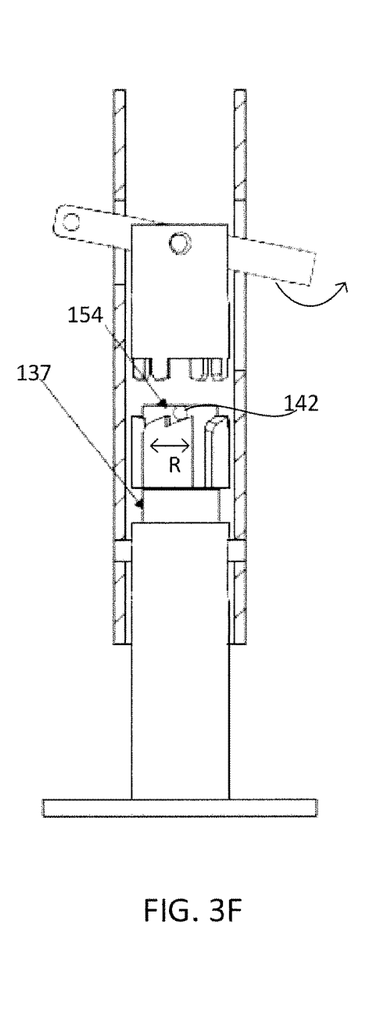

Yet further, FIGS. 3e and 3f schematically illustrates a cross-sectional view corresponding to FIG. 3d, at the end of the support post in FIG. 1, according to the yet another aspect of the invention. FIG. 3e schematically illustrates a cross-sectional view of the one end 10 of the support post 2 in connection with the surface support element 114. FIG. 3e shows the one end 10 of the support post 2 with the lever 126 arranged in a second position II in a stressed condition of the spring 118. The surface support element 114 is projecting in a direction away D1 from the open end 10 of the support post. Consequently, as illustrated in FIGS. 3a-3e, moving the lever 126 from the first position I to the second position II, and vice versa, resiliently affect the surface support element 114 in a direction to and from the open end 10 of the support post 2.

As further illustrated in FIGS. 3a-3e, the profile member 116 may be provided as a tube portion 134 where the second end 124 of the spring 118 is arranged within the tube portion 134. Thus, the whole spring 118 may be enclosed by the tube portion. The inner portion 132 of the lever 126 may be pivotally arranged in a pivot 135 at the tube wall section 122 of tube 6 opposite the outer end 130 of the lever 126. The inner portion 132 of the lever 126 may be in engagement, in direct or indirect contact, with the first end 20 of the spring 18. At least two plungers 136, 137 may be slidingly arranged within the tube wall section 122 of tube 6 and the tube portion 134. As illustrated in FIGS. 3a-3e, there may be two plungers 136 and 137, an upper plunger 136 and a lower plunger 137, and the inner portion 132 of the lever 126 may be in pivotal connection in a pivot 132 with an upper side 138 of upper plunger 136. The lower side 140 of the lower plunger 137 may be in engagement with the spring 118. The lower plunger 137 may be rotatable arranged R. A locking pin 142 may be in engagement with the lower plunger 137 to limit the movement of the lower plunger 137. The locking pin 142 may be fixed to the tube wall section 122 close to the open end 10 of the support post. The locking pin 142 may extend perpendicular into the tube with respect to the longitudinal direction L of the support post. The plunger 137 may be provided with a slot 150. The locking pin 142 may extend at least through a part of the slot 150 of the lower plunger 137.

As mentioned above, FIG. 3d shows the one end 10 of the support post 2 with the lever 126 arranged in a first position I in an unstressed condition of the spring 118. The surface support element 114 is retracted by the tension of a tension spring 156 in a direction towards the open end 10 of the support post, which avoids undesired play of the surface support element 114. The upper plunger 136 may have a plurality of projecting arms 152 at the lower side in engagement with the lower plunger 137, which upper side may be provided with a cam profile 154. The upper plunger 136 is pivotally connected to the lever 126 and by moving the lever 126 to the second position as evident from FIG. 3e, projecting arms 152 of upper plunger 136 are pushed towards the cam profile 154 of the lower plunger 137, such that each projecting arm 152 is in firm engagement with each cam on the cam profile 154. The rotation of the lower plunger is restrained when the locking pin is within the slot 150. When the lower plunger is pushed down, the locking pin leaves the slot and enters the upper side of the lower plunger 137 provided with the cam profile 154. The lower plunger 137 is now free to rotate R at least as far as the projecting arms 152 reach the adjacent cam on the cam profile 154. The locking pin 142 is trapped on the cam next to the slot 150, and the lower plunger 137 is locked from further displacement and stays in the compressed condition II of the spring as shown in FIG. 3f. The upper plunger 136 may be lifted up in a rest position as shown in FIG. 3f and may be pushed down by the lever in order to press down the lower plunger 137 again. The projecting arms 152 of upper plunger 136 are pushed towards the cam profile 154 of the lower plunger 137, such that each projecting arm 152 is in firm engagement with each cam on the cam profile 154. The lower plunger 137 is now free to rotate R at least as far as the projecting arms 152 reach the adjacent cam on the cam profile 154. The locking pin 142 enters the next cam and the adjacent slot, and the lower plunger 137 is now free to be pushed up due to the spring force. The one end 10 of the support post 2 with the lever 126 is arranged back in a first position I in an unstressed condition of the spring 118 as shown in FIG. 3*d*.

For installation, the support post is prepared between two opposing surfaces by pulling apart the tubes 4, 6 such that the surface support element provided at least on one of the tube ends is close to one surface. The locking device 8 is activated to hold the tubes 4, 6 in a locked state relative each other. The other end of the support post should at the same time be in contact, or in close contact, with the opposing surface. By moving the lever 126 to the second position as evident from FIG. 3*e*, the lower plunger 137 compress the spring 118 such that the support post 2 is set in the stressed condition II. At the same time the surface support element is pressed against the surface, while the other end of the support post is pressed against the opposing surface.

Figure 4:
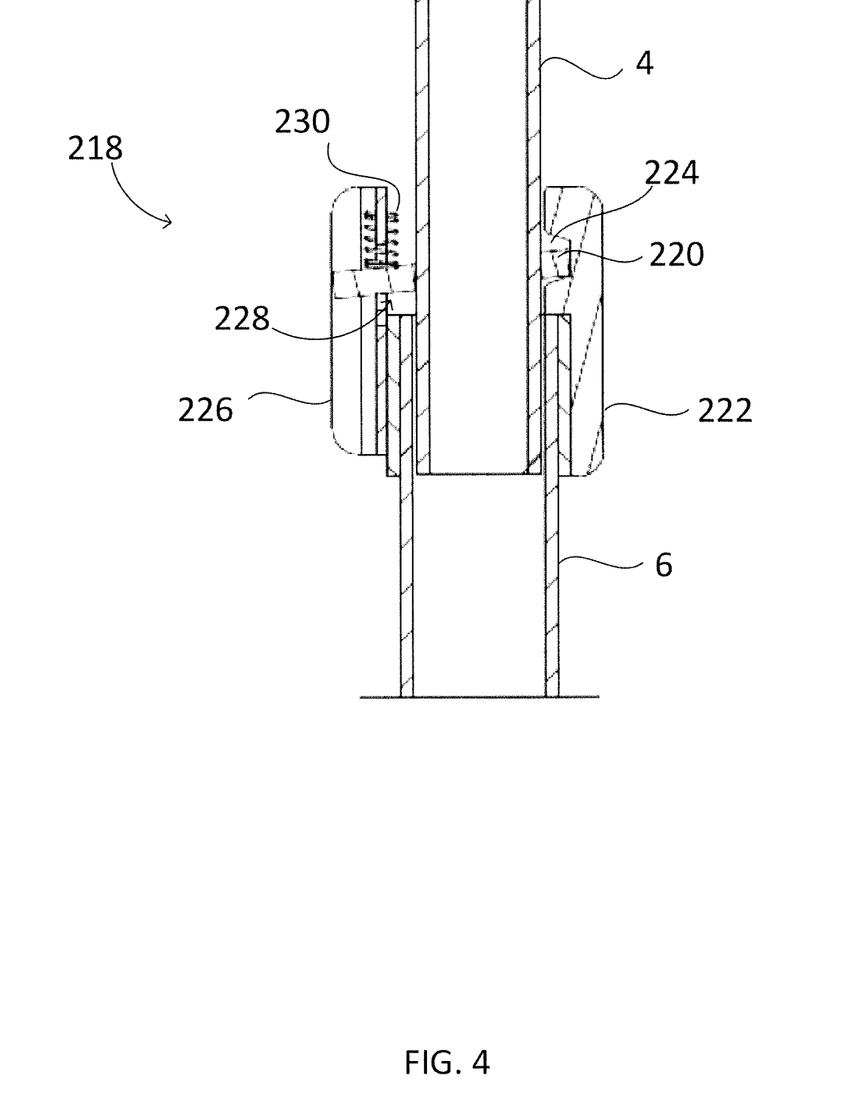

FIG. 4 schematically illustrates a cross-sectional view of a locking device for a support post as shown in FIG. 1, according to a further aspect of the invention. The support post 2 comprises a locking device 8 holding the tubes 4, 6 in a locked state relative each other and allowing relative sliding of the tubes into each other in an unlocked state. According to the further aspect of the invention shown in FIG. 4, a locking device 218 comprises a locking ring 220 loosely arranged on one of the tubes 4, the locking device 218 further comprises a first ring holding arm 222 arranged at one end of the other tube 6. The locking ring 220 has a through hole which is close in size but slightly larger than the cross sectional area of the tube 4. The first ring holding arm 222 having a first recess 224 for retaining the locking ring 220 in loose arrangement around said tube 4 but with limited movability of the locking ring 220. The locking device 218 may further comprise a second ring holding arm 226 arranged at a distance from the first ring holding arm 222 at the end of the other tube 6. The second ring holding arm 226 may have a second recess 228 for retaining the locking ring 220 in a biased position that may be provided by means of a ring pressing spring 230, such that the locking ring 220 tilts downwards.

This creates an arrangement where the width of the hole in the locking ring 220, in a horizontal direction, will be lowered when the locking ring 220 is tilted. This in turn means that the edges of the hole will engage the sides of the tube 4, which will lock the tube 4 in place in regards of downwards movement. If the tube 4 is moved upwards, the side of the tube 4 will push the locking ring 220 upwards, and the locking ring 220 can follow the upwards movement which will release the locking engagement. This effect can be further improved if a ring pressing spring 230 is used. By compressing ring pressing spring 230, the locking ring 220 can follow the upwards movement which will release the locking engagement. As is obvious, this describes the movement restriction state of the locking ring 220, which allows an upward directed adjustment of the tube 4. For installation, the support post is prepared between two opposing surfaces by pulling apart the tubes 4, 6 such that the surface support element 14 provided at least on one of the tube ends is close to one surface. As soon as an upward directed adjustment is completed and the person performing the adjustment let go of the tube 4, gravity will cause the locking ring 220 to again engage and the tube 4 in a fix position. Hence, the locking device 218 is set to hold the tubes 4, 6 in a locked state relative each other. In order to disassemble the support post from the installation, the tubes 4, 6 are telescoped into each other by pushing the locking ring 220, for instance by hand or any suitable mechanism. Then the tube may freely be telescoped into tube 6 since the side of tube 4 is free from being engaged by the locking ring 220. This effect can be further improved if a ring pressing spring 230 is used, by pushing the locking ring 220 upwards to compress the ring pressing spring 230.

As should be realized, the components and features specified above may within the framework of the invention be combined between the different embodiments specified.

The invention claimed is:

1. A support post (2) comprising:
   at least two tubes (4, 6) telescopically in sliding connection to each other,
   a locking device (8) holding the tubes in a locked state relative each other and allowing relative sliding of the tubes into each other in an unlocked state, at least one open end (10) of the support post has an opening (12; 112) in connection with a surface support element (14; 114) having a profile member (16; 116) in sliding engagement with the open end of the support post, a spring (18; 118) is in a first end (20; 120) arranged within the opening of the support post and surrounded by a tube wall section (22; 122) of one of the tubes, and a second end (24; 124) of the spring is arranged to act on the surface support element (14; 114), to resiliently affect the surface support element (14; 114) in a direction away (D1) from the open end (10) of the support post and vice versa,
   wherein:
   the locking device (8; 218) comprises a locking ring (220) loosely arranged on one of the tubes (4), the locking device (8, 218) further comprises a first ring holding arm (222) arranged at one end of the other tube (6), the first ring holding arm (222) having a first recess (224) for retaining the locking ring in loose arrangement around said tube (4) with limited movability,
   a lever (26, 126) is arranged close to the open end (10) of the support post (2), the lever (26, 126) has a free outer end (30, 130) positioned outside of the support post and an inner portion (32; 132) in engagement with the spring (18; 118) within the opening (12, 112) of the support post, the lever (26; 126) is arranged in a first position (I) in an unstressed condition of the spring (18; 118) where the surface support element (14; 114) is retracted in a direction towards the open end (10) of the support post, whereas the lever (26; 126) is arranged in a second position (II) in a stressed condition of the spring (18; 118) where the surface support element (14; 114) is projecting in a direction away (D1) from the open end (10) of the support post, whereby moving the lever (26; 126) from the first position (I) to the second position (II), and vice versa, resiliently affect the surface support element (14; 114) in a direction to and from the open end (10) of the support post (2),
   the surface support element is arranged to be installed on a floor,
   the lever is a pedal, and
   the profile member (16; 116) is a tube portion (34; 134) and the second end (24; 124) of the spring (18; 118) is arranged within the tube portion (34; 134).

2. The support post according to claim 1, wherein the inner portion (32; 132) of the lever (26; 126) is in engagement with the first end (20, 120) of the spring (18; 118).

3. The support post according to claim 2, wherein at least one plunger (36, 136, 137) is slidingly arranged within the tube portion (34; 134), the inner portion (32; 132) of the lever (26; 126) is in connection with an upper side (38; 138)

of the plunger (36; 136) and the lower side (40; 140) of the plunger (36; 137) is in engagement with the spring (18; 118).

4. The support post according to claim 1, wherein the tube wall section (22) comprises an attachment (44) for locking the lever (26) when the lever is arranged in the second position (II) in a stressed condition of the spring (18).

5. The support post according to claim 4, wherein the lever (26) is connected to a hook-shaped link (46) that interacts with the attachment (44) for locking the lever in the second position (II).

6. The support post according to claim 3, wherein the lever (26) is connected to the plunger (36) via a link arm (48), which is pivotally connected to the lever (26) in one end (52) and to the plunger (36) in a second end (54).

7. The support post according to claim 1, wherein a tension spring (156) is arranged to the surface support element and fixedly arranged to the tube wall section.

8. A support post (2) comprising:
at least two tubes (4, 6) telescopically in sliding connection to each other,
a locking device (8) holding the tubes in a locked state relative each other and allowing relative sliding of the tubes into each other in an unlocked state, at least one open end (10) of the support post has an opening (12; 112) in connection with a surface support element (14; 114) having a profile member (16; 116) in sliding engagement with the open end of the support post, a spring (18; 118) is in a first end (20; 120) arranged within the opening of the support post and surrounded by a tube wall section (22; 122) of one of the tubes, and a second end (24; 124) of the spring is arranged to act on the surface support element (14; 114), to resiliently affect the surface support element (14; 114) in a direction away (D1) from the open end (10) of the support post and vice versa,
wherein:
the locking device (8; 218) comprises a locking ring (220) loosely arranged on one of the tubes (4), the locking device (8, 218) further comprises a first ring holding arm (222) arranged at one end of the other tube (6), the first ring holding arm (222) having a first recess (224) for retaining the locking ring in loose arrangement around said tube (4) with limited movability,
a lever (26, 126) is arranged close to the open end (10) of the support post (2), the lever (26, 126) has a free outer end (30, 130) positioned outside of the support post and an inner portion (32; 132) in engagement with the spring (18; 118) within the opening (12, 112) of the support post, the lever (26; 126) is arranged in a first position (I) in an unstressed condition of the spring (18; 118) where the surface support element (14; 114) is retracted in a direction towards the open end (10) of the support post, whereas the lever (26; 126) is arranged in a second position (II) in a stressed condition of the spring (18; 118) where the surface support element (14; 114) is projecting in a direction away (D1) from the open end (10) of the support post, whereby moving the lever (26; 126) from the first position (I) to the second position (II), and vice versa, resiliently affect the surface support element (14; 114) in a direction to and from the open end (10) of the support post (2),
the surface support element is arranged to be installed on a floor,
the lever is a pedal, and
the tube wall section (22) comprises an attachment (44) for locking the lever (26) when the lever is arranged in the second position (II) in a stressed condition of the spring (18).

9. The support post according to claim 8, wherein the lever (26) is connected to a hook-shaped link (46) that interacts with the attachment (44) for locking the lever in the second position (II).

10. The support post according to claim 8, wherein a tension spring (156) is arranged to the surface support element and fixedly arranged to the tube wall section.

11. A support post (2) comprising:
at least two tubes (4, 6) telescopically in sliding connection to each other,
a locking device (8) holding the tubes in a locked state relative each other and allowing relative sliding of the tubes into each other in an unlocked state, at least one open end (10) of the support post has an opening (12; 112) in connection with a surface support element (14; 114) having a profile member (16; 116) in sliding engagement with the open end of the support post, a spring (18; 118) is in a first end (20; 120) arranged within the opening of the support post and surrounded by a tube wall section (22; 122) of one of the tubes, and a second end (24; 124) of the spring is arranged to act on the surface support element (14; 114), to resiliently affect the surface support element (14; 114) in a direction away (D1) from the open end (10) of the support post and vice versa,
wherein:
the locking device (8; 218) comprises a locking ring (220) loosely arranged on one of the tubes (4), the locking device (8, 218) further comprises a first ring holding arm (222) arranged at one end of the other tube (6), the first ring holding arm (222) having a first recess (224) for retaining the locking ring in loose arrangement around said tube (4) with limited movability,
a lever (26, 126) is arranged close to the open end (10) of the support post (2), the lever (26, 126) has a free outer end (30, 130) positioned outside of the support post and an inner portion (32; 132) in engagement with the spring (18; 118) within the opening (12, 112) of the support post, the lever (26; 126) is arranged in a first position (I) in an unstressed condition of the spring (18; 118) where the surface support element (14; 114) is retracted in a direction towards the open end (10) of the support post, whereas the lever (26; 126) is arranged in a second position (II) in a stressed condition of the spring (18; 118) where the surface support element (14; 114) is projecting in a direction away (D1) from the open end (10) of the support post, whereby moving the lever (26; 126) from the first position (I) to the second position (II), and vice versa, resiliently affect the surface support element (14; 114) in a direction to and from the open end (10) of the support post (2),
the surface support element is arranged to be installed on a floor,
the lever is a pedal,
the inner portion (32; 132) of the lever (26; 126) is in engagement with the first end (20; 120) of the spring (18; 118),
at least one plunger (36, 136, 137) is slidingly arranged within the tube portion (34; 134), the inner portion (32; 132) of the lever (26; 126) is in connection with an upper side (38; 138) of the plunger (36; 136) and the lower side (40; 140) of the plunger (36; 137) is in engagement with the spring (18; 118), and the lever (26) is connected to the plunger (36) via a link arm (48), which is pivotally connected to the lever (26) in one end (52) and to the plunger (36) in a second end (54).

12. The support post according to claim 11, wherein a tension spring (156) is arranged to the surface support element and fixedly arranged to the tube wall section.

* * * * *